United States Patent [19]
Pagano

[11] Patent Number: 6,091,907
[45] Date of Patent: Jul. 18, 2000

[54] FILM CARTRIDGE WITH MASKING SLIDE FOR COVERING ELECTRICALLY READABLE ENCODEMENT AND UNCOVERING EXPOSED FILM INDICATOR ON CARTRIDGE

[75] Inventor: Daniel M. Pagano, Honeoye Falls, N.Y.

[73] Assignee: Eastman Kodak Company, Rochester, N.Y.

[21] Appl. No.: 08/832,146

[22] Filed: Apr. 2, 1997

[51] Int. Cl.⁷ .............................. G03B 7/24; G03B 17/26
[52] U.S. Cl. .......................... 396/207; 396/512; 396/515
[58] Field of Search .................................. 396/207, 208, 396/209, 511, 512, 513, 514, 515, 516, 517, 518, 519, 520, 522, 523; 242/344, 348

[56] References Cited

U.S. PATENT DOCUMENTS

| | | | |
|---|---|---|---|
| 3,266,397 | 8/1966 | Kremp et al. | 396/207 |
| 4,565,434 | 1/1986 | Notagashira | 396/532 |
| 4,860,892 | 8/1989 | Roberts | 206/389 |
| 4,918,471 | 4/1990 | Harling et al. | 354/21 |
| 5,239,437 | 8/1993 | Hoge et al. | 360/132 |
| 5,255,039 | 10/1993 | Miller | 354/275 |
| 5,264,886 | 11/1993 | Byrd | 396/515 |
| 5,265,819 | 11/1993 | Enomoto et al. | 242/348 |
| 5,278,600 | 1/1994 | Takahashi et al. | 396/515 |
| 5,406,346 | 4/1995 | Hayakawa | 354/275 |
| 5,568,219 | 10/1996 | Manico et al. | 242/348 |
| 5,608,485 | 3/1997 | Kataoka et al. | 396/514 |

*Primary Examiner*—Eddie C. Lee
*Attorney, Agent, or Firm*—Roger A. Fields

[57] ABSTRACT

A film cartridge comprising a housing having an outer array of electrically sensible areas which can be sensed by a similar array of electrical probes in a camera, is characterized in that a masking slide is supported on the housing for movement between a non-masking position not covering the outer array of electrically sensible areas on the housing, to permit the electrical probes to sense the respective areas, and a masking position covering at least a portion of the outer array of electrically sensible areas, to prevent the electrical probes from sensing the covered areas. Optionally, the housing has an outer exposed film indicator, and the masking slide covers the exposed film indicator when the masking slide is in its non-masking position and uncovers the exposed film indicator when the masking slide is in its masking position.

10 Claims, 4 Drawing Sheets

FILM CARTRIDGE WITH MASKING SLIDE FOR COVERING ELECTRICALLY READABLE ENCODEMENT AND UNCOVERING EXPOSED FILM INDICATOR ON CARTRIDGE

FIELD OF THE INVENTION

The invention relates generally to the field of photography, and in particular to film cartridges which contain a filmstrip. More specifically, the invention relates to a film cartridge with a masking slide for covering an electrically readable encodement and uncovering an exposed film indicator on the cartridge. After the filmstrip is exposed and returned to the cartridge, the encodement is covered to prevent it from being sensed, and the indicator is uncovered to provide a warning to the photographer.

BACKGROUND OF THE INVENTION

In 1983, Kodak introduced its DX system of encoding electrically readable information on a conventional film cartridge containing a 35 mm filmstrip. A DX cartridge has the ISO speed (exposure index), the number of exposures and the exposure latitude (range) of the filmstrip encoded by imprinting a checker board pattern of conductive and insulating patches or sensing areas on the exterior side of the metal housing of the cartridge. There are twelve patches, divided into two rows of six each. An array of electrical probes in a camera's cartridge-receiving chamber contacts the patches to make use of the information when the cartridge is loaded in the chamber. There are two probes for each patch. The purpose of this redundancy is to assure good electrical reliability. Patches 1 and 7 are common/ground. Patches 2 through 6 encode the ISO speed from 25 to 5000 in twenty-four steps. Patches 8 through 10 encode the number of exposures, from 12 to 72 exposures, in seven steps. Patches 11 and 12 encode the exposure latitude, from + or −0.5, EV to +3, −1 EV, in four steps.

After the filmstrip is exposed and returned to the film cartridge, the cartridge is removed from the camera's cartridge-receiving chamber. In order to provide the photographer with a warning that the cartridge now contains exposed film, an exposed film indicator on the cartridge is uncovered. For example, U.S. Pat. No. 5,255,039 issued Oct. 19, 1993 discloses a cartridge having a pull-strip with an exposed film indicator that is originally hidden beneath a cover superimposed over a metal housing of the cartridge. When the pull-strip is manually pulled, the exposed film indicator is moved from beneath the cover into a cut-out in the cover to permit the exposed film indicator to be seen.

SUMMARY OF THE INVENTION

A film cartridge comprising a housing having an outer array of electrically sensible areas which can be sensed by a similar array of electrical probes in a camera, is characterized in that:

a masking slide is supported on the housing for movement between a non-masking position not covering the outer array of electrically sensible areas on the housing, to permit the electrical probes to sense the respective areas, and a masking position covering at least a portion of the outer array of electrically sensible areas, to prevent the electrical probes from sensing the covered areas.

Optionally, the housing has an outer exposed film indicator, and the masking slide covers the exposed film indicator when the masking slide is in its non-masking position and uncovers the exposed film indicator when the masking slide is in its masking position.

DETAILED DESCRIPTION OF THE INVENTION

Figure 1:
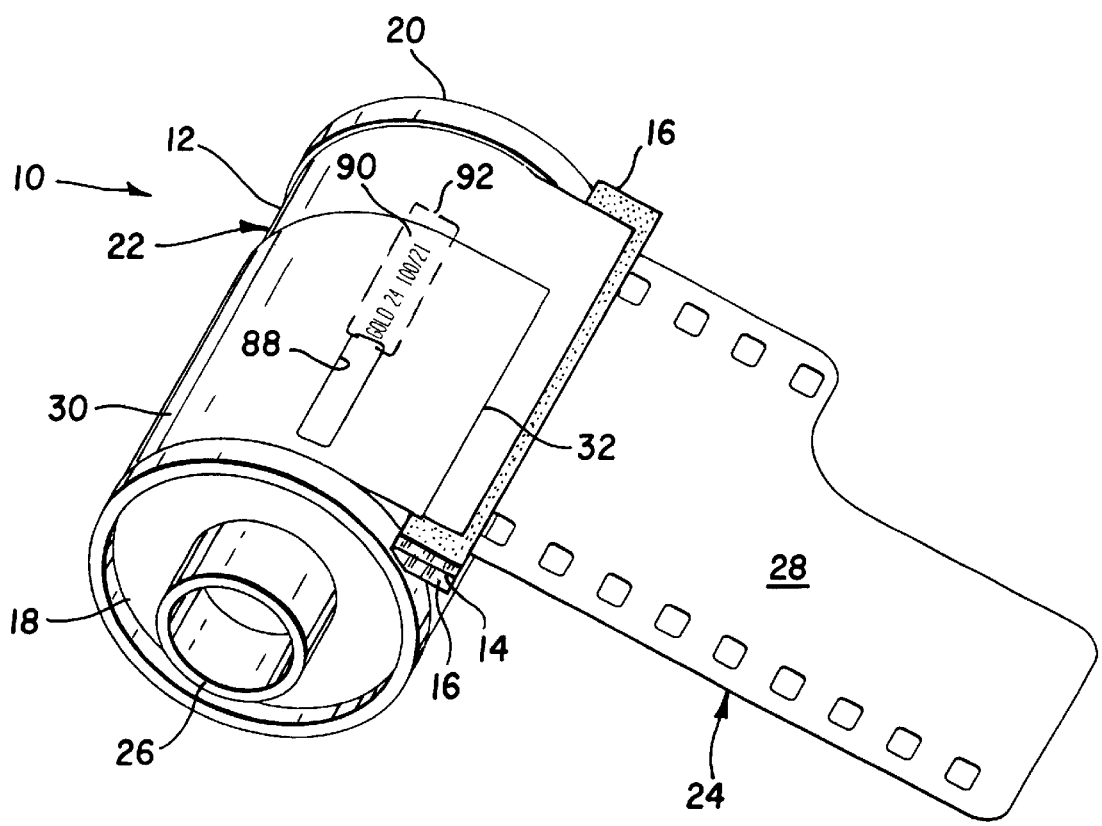
FIG. 1 is a top-side perspective view of a film cartridge with a masking slide according to a preferred embodiment of the invention, showing the masking slide in a non-masking position.

The invention is disclosed as being embodied preferably in a film cartridge containing a 35 mm filmstrip. Because the features of a film cartridge with a 35 mm filmstrip are well known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a film cartridge 10 comprising a metal cylindrical can 12 which has a film passage slit 14 lined with a parallel pair of light-trapping plush pads 16, 16, and a pair of metal end caps 18 and 20 which cover opposite ends of the cylindrical can. The can 12 and the end caps 18 and 20 together form a housing 22. A 35 mm filmstrip 24 is wound onto a film spool 26 rotatably supported within the housing 22. A leader portion 28 of the filmstrip 26 originally protrudes from the film passage slit 14.

A metal masking sleeve or slide 30 partially encircles the can 12 and terminates at respective end-edges 32 and 34 proximate the film passage slit 14. The masking slide 30 is supported on the can 12 for movement away from the end cap 18 to the end cap 20 from a non-masking position shown in FIGS. 1 and 3 to a masking position shown in FIGS. 2 and 4.

The can 12 and the masking slide 30 together have a complete set of twelve, electrically sensible, outer areas 36, 38, 40, 42, 44, 46, 48, 50, 52, 54, 56 and 58 in accordance with the DX system of encoding electrically readable information. The areas 36, 38, 40, 42, 44, 46, 48, 50, 52, 54, 56 and 58 form a checker board pattern of conductive and insulating patches, divided into two rows of six each. An array of known type electrical probes or sensors 60, 62, 64, 66, 68, 70, 72, 74, 76, 78, 80 and 82 in a camera's cartridge-receiving chamber (not shown) contacts the respective patches 36, 38, 40, 42, 44, 46, 48, 50, 52, 54, 56 and 58 to make use of the information when the cartridge 10 is loaded in the chamber. Preferably, there are two probes (only one shown) for each patch. The purpose of this redundancy is to assure good electrical reliability. Adjoining patches 40 and 52 on the masking slide 30 are common/ground. Patches 38, 40 and 42 on the masking slide 30 and patches 44 and 46 on the can 12 encode the ISO speed from 25 to 5000 in twenty-four steps. Patches 50, 52 and 54 on the masking slide 30 encode the number of exposures, from 12 to 72 exposures, in seven steps. Patches 56 and 58 on the can 12 encode the exposure latitude, from + or −0.5, EV to +3, −1 EV, in four steps. For the sake of illustration, the patches 40, 46, 50, 54 and 56 that are insulating patches are shown covered by black non-conductive paint. See FIGS. 3 and 4. Conversely, the patches 36, 38, 42, 44, 48, 52 and 58 not shown covered by the black paint, i.e. bare metal patches, are conductive patches. Except for the patches 36 and 48, which are always common/ground and therefore must always be conductive patches, the other patches can vary in regard to being insulating or conductive in order to provide various electrically readable encodements. Since the can 12 and the masking slide 30 are both metal, conductivity between the patches 40 and 52 on the masking slide, which are common/ground, and the patches 44 and 58 on the can exists.

Figure 3:
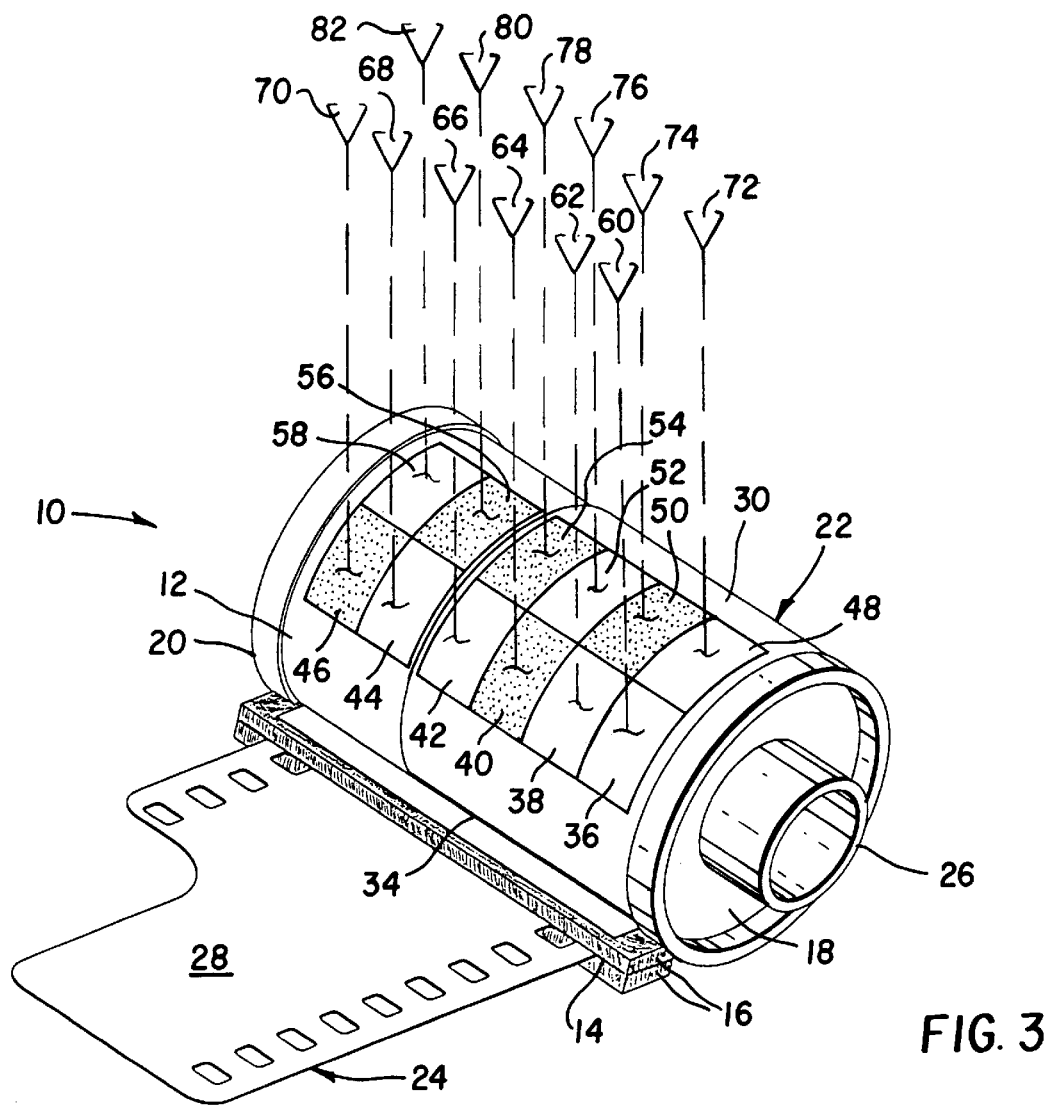
FIG. 3 is an underside perspective view of the film cartridge, showing the masking slide in its non-masking position.
Figure 4:
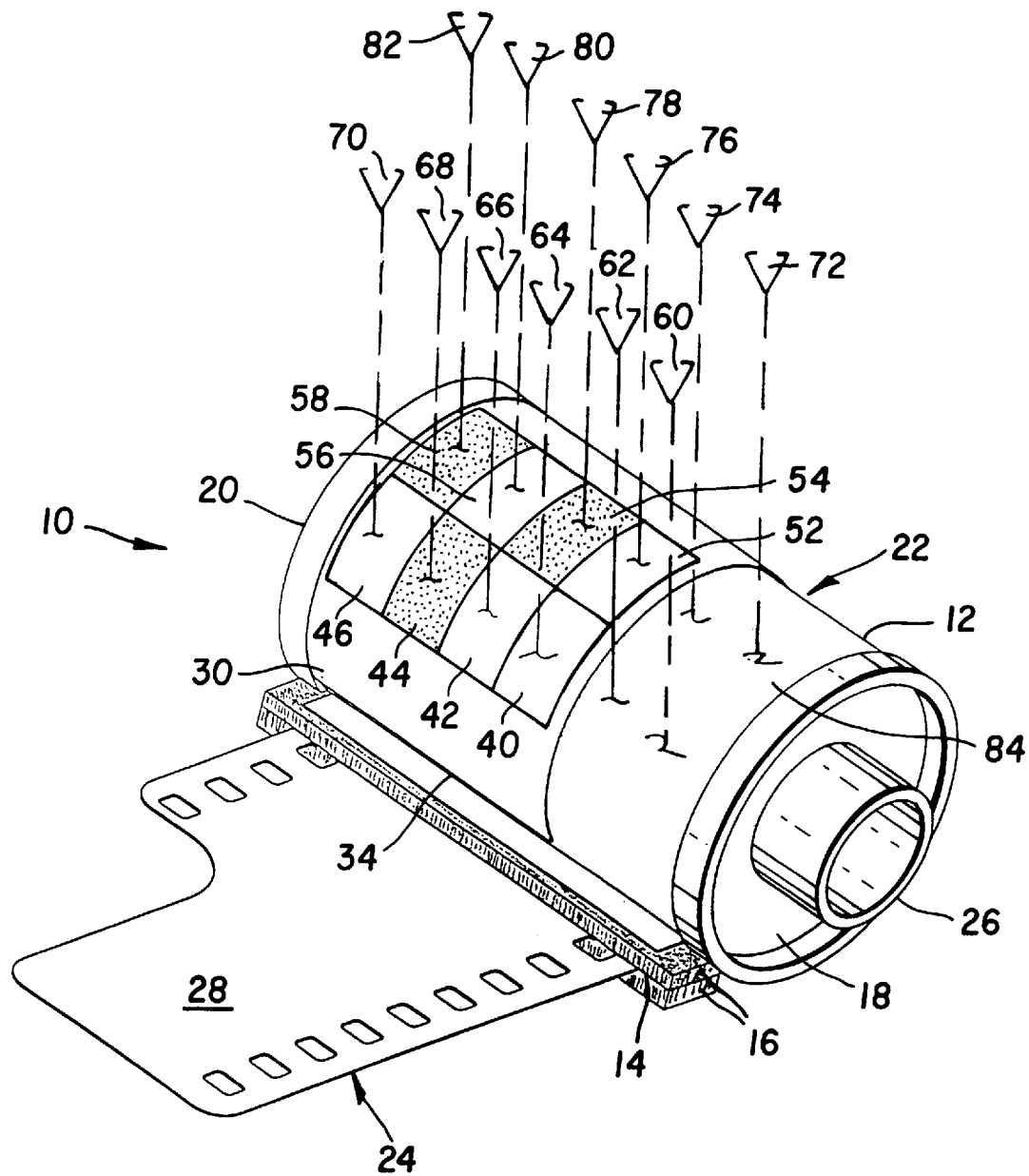
FIG. 4 is an underside perspective view of the film cartridge, showing the masking slide in its masking position

As shown in FIG. 3, when the masking slide 30 is in the non-masking position, it does not cover the patches 44, 46, 56 and 58 on the can 12. This permits the electrical probes 60, 62, 64, 66, 68, 70, 72, 74, 76, 78, 80 and 82 to contact the respective patches 36, 38, 40, 42, 44, 46, 48, 50, 52, 54, 56 and 58. As shown in FIG. 4, when the masking slide 30 is in the masking position, it covers the patches 44, 46, 56 and 58 on the can 12. This prevents the electrical probes 68, 70, 80 and 82 from contacting the covered patches 44, 46, 56 and 58, and prevents the probes 60, 62, 72 and 74 from contacting the shifted patches 36, 38, 48 and 50.

The can 12 has a discrete outer insulating area 84 spaced from the patches 44, 46, 56 and 58 on the can. See FIG. 4. As shown in FIG. 3, when the masking slide 30 is in the non-masking position, the conductive patches 36 and 48 on the masking slide cover the insulating area 84. Conversely, as shown in FIG. 4, when the masking slide 30 is in the masking position, the insulating area 84 is uncovered. Consequently, the probes the probes 60, 62, 72 and 74 can only contact the insulating area 84. In this instance, the electrically encoded information cannot be read.

Figure 2:
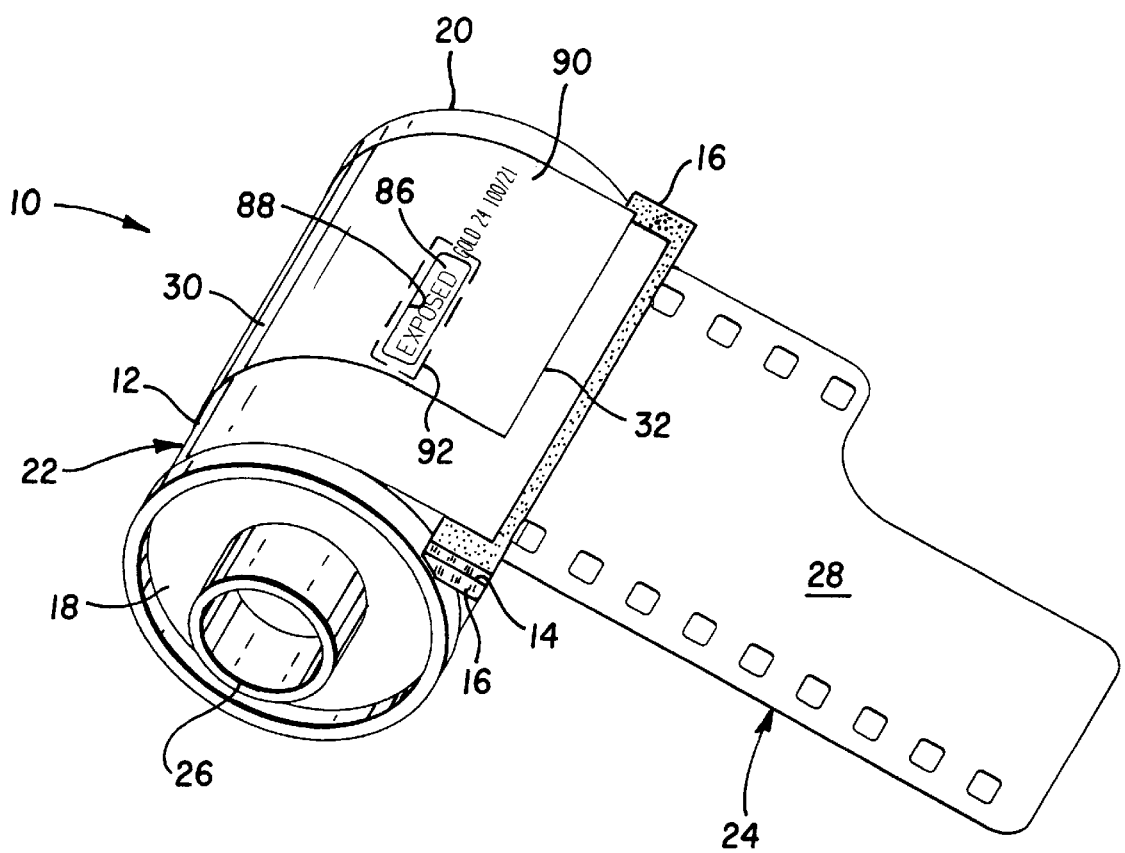
FIG. 2 is a top-side perspective view of the film cartridge, showing the masking slide in a masking position.

The can 12 has an outer, printed, exposed film indicator 86 shown in FIG. 2. As shown in FIG. 1, the masking slide 30 covers the exposed film indicator 86 when the masking slide is in its masking position. As shown in FIG. 2, the masking slide 30 uncovers the exposed film indicator 86 at a window 88 in the masking slide when the masking slide is in its non-masking position.

The masking slide 30 has outer, printed, film-related information 90, such as the number of exposures and the ISO speed, shown in FIG. 1. The film-related information 90 is visible through a camera window 92 when the masking slide 30 is in its masking position, but is not visible in the camera window when the masking slide is in its non-masking position. See FIGS. 1 and 2.

The invention has been described with reference to a preferred embodiment. However, it will be appreciated that variations and modifications can be effected by a person of ordinary skill in the art without departing from the scope of the invention.

PARTS LIST 10. film cartridge
12. cylindrical can
14. film passage slit
16, 16. plush pads
18. end cap
20. end cap
22. housing
24. filmstrip
26. film spool
28. leader portion
30. masking sleeve or slide
32. slide end-edge
34. slide end-edge
36. patch
38. patch
40. patch
42. patch
44. patch
46. patch
48. patch
50. patch
52. patch
54. patch
56. patch
58. patch
60. probe
62. probe
64. probe
66. probe
68. probe
70. probe
72. probe
74. probe
76. probe
78. probe
80. probe
82. probe
84. insulating area
86. exposed film indicator
88. slide window
90. film-related information
92. camera window

What is claimed is:

1. A film cartridge comprising a housing having an outer array of electrically sensible areas which can be sensed by a similar array of electrical probes in a camera, is characterized in that:

a masking slide is supported on said housing for movement completely on the housing between a non-masking position not covering said outer array of electrically sensible areas on the housing, to permit the electrical probes to sense the respective areas, and a masking position covering at least a portion of the outer array of electrically sensible areas, to prevent the electrical probes from sensing the covered areas.

2. A film cartridge as recited in claim 1, wherein said masking slide includes an outer array of electrically sensible areas which supplement said outer array of electrically sensible areas on the housing and which are sensible independently of the outer array of electrically sensible areas on the housing when said masking slide is in the non-masking position completely on the housing in order to increase the number of individually sensible areas on the housing to provide a complete set of sensible areas.

3. A film cartridge as recited in claim 2, wherein said complete set of sensible areas on the housing and the masking slide consists of twelve sensible areas.

4. A film cartridge as recited in claim 2, wherein said complete set of sensible areas on the housing and the masking slide form a pattern of conductive and insulating patches, said housing has an outer insulating area spaced from said outer array of electrically sensible areas on the housing, and said masking slide covers said outer insulating area when the masking slide is in the non-masking position completely on the housing and uncovers the outer insulating area when the masking slide is in the masking position completely on the housing.

5. A film cartridge as recited in claim 4, wherein said outer array of electrically sensible areas on the masking slide includes a pair of adjoining conductive patches that are located over said outer insulating area on the housing only when the masking slide is in the non-masking position completely on the housing.

6. A film cartridge as recited in claim 1 wherein said housing has an outer exposed film indicator, and said masking slide covers said exposed film indicator when the masking slide is in the non-masking position and uncovers the exposed film indicator when the masking slide is in the masking position.

7. A film cartridge as recited in claim 1 wherein said housing includes a cylindrical can having a film passage slit, and said masking slide includes a sleeve that partially encircles said cylindrical can and terminates at respective end-edges proximate said film passage slit.

8. A film cartridge as recited in claim 7, wherein said housing includes a pair of end caps on said cylindrical can, and said masking slide is movable away from one of said end caps and towards the other end cap completely on the housing when the masking slide is moved from the non-masking position to the masking position.

9. A film cartridge comprising a cylindrical can having a film passage slit, and a pair of end caps on said cylindrical can, is characterized in that:

said cylindrical can has an outer exposed film indicator; and a masking sleeve partially encircles said cylindrical can and terminates at respective end-edges proximate said film passage slit, and is supported for movement completely on said housing over said cylindrical can away from one of said end caps and towards the other end cap between a covering position covering said exposed film indicator and a non-covering position uncovering the exposed film indicator.

10. A film cartridge comprising a housing having an outer array of electrically sensible areas which can be sensed by a similar array of electrical probes in a camera, is characterized in that:

said housing has an outer exposed film indicator; and a masking slide is supported on said housing for movement between a non-masking position covering said exposed film indicator, and not covering said outer array of electrically sensible areas on the housing to permit the electrical probes to sense the respective areas, and a masking position not covering the exposed film indicator, and covering at least a portion of the outer array of electrically sensible areas to prevent the electrical probes from sensing the covered areas.

\* \* \* \* \*